Patented Nov. 24, 1931

1,833,612

UNITED STATES PATENT OFFICE

HUBERT E. LLOYD, OF BOUND BROOK, NEW JERSEY, ASSIGNOR TO THE RUBEROID CO., OF NEW YORK, N. Y., A CORPORATION OF NEW JERSEY

PAINT

No Drawing.   Application filed February 18, 1927.   Serial No 169,415.

This invention relates to improvements in the manufacture of paints having fatty-acid pitch for a base.

It is generally recognized that fatty-acid pitches containing saponifiable matter are resistant to weathering, and that paints of which such pitch forms the base are superior in wearing qualities to those having a base formed of the usual bituminous substances, such as petroleum asphalt, or coal-tar pitch.

A method now commonly used for manufacturing fatty-acid pitch base paints is to dissolve or "thin out" the base with a volatile solvent, such as petroleum spirits, and then to add pigments or coloring substances. The solvent, while increasing the cost of the paint, imparts nothing of value to the dried paint film and is employed merely to put the paint in a usable form. Upon application of the paint to the surface to be coated, the solvent is lost through evaporation.

I have found that a paint containing saponifiable fatty-acid pitch, either alone or in admixture with asphalt, may be inexpensively prepared, without the costly solvent, by use of an emulsifying or suspending agent, such as an aqueous solution of alkaline caseinate, together with a small quantity of ammonia, and the addition of pigments. The use of a saponifiable fatty-acid pitch base permits of the production of paints of brighter colors and hues than is possible with paints having bases of non-saponifiable pitches or other bituminous substances, or than is obtainable with the usual bituminous-solvent paints.

The resultant paint produces a superior weather resisting film having the properties of durability, drying rapidly, flexibility, elasticity, that is to say ability to withstand normal expansion and contraction without forming cracks or checks, and of being resistant to moisture, temperature changes, and disintegration by atmospheric agencies.

Because of these properties and characteristics, the resultant paint is particularly suitable for resurfacing defective or worn roofs composed of prepared roll roofing or shingles having a facing of particles of slate or other mineral matter, and is also usable for coating bituminized roofing and flooring materials composed of felt or other fabrics impregnated, or both impregnated and coated, with asphalt or other bituminous substances. For use in resurfacing roofs, the paint may be made of brilliant color closely approximating the original or natural coloring of the surfacing material. While I have pointed out certain uses for which the paint is adapted, it is to be understood that I do not limit myself with respect to any particular use.

In preparing the paint, the base consisting of fatty-acid pitch, or fatty-acid pitch and asphalt, is mixed either with dry pulverized casein as such, or else with an aqueous solution of alkaline caseinate, such as sodium caseinate. In the former case, an aqueous solution of an alkaline reagent, such as borax, is incorporated with the mixture of paint base and dry pulverized casein. In the latter case, the caseinate solution is stirred into the paint base. In either instance, after introducing the caseinate or the alkaline solution of borax, a small quantity of ammonia is added. The mixture is further thinned with water, and the desired pigment may then be stirred or ground in.

The preferred method of preparing the paint consists in liquefying the base by heat to such consistency that it may be easily stirred. The temperature necessary for this depends upon the fusing point of the base. For instance, a base having a fusing point of 70° F., by the Kramer and Sarnow method, can be mixed with the aqueous caseinate solution at about 150°–175° F. The caseinate solution should be made neutral to litmus by the alkaline reagent before its admixture with the base. When these materials have been thoroughly mixed, ammonia is added, and the mass is either thinned with water and then the pigment added; or else part of the water may be added first, followed by a portion of the pigment, then more water, and the balance of the pigment. In this way the pigment may be incorporated to better advantage, by the simple expedient of stirring it into the viscous mass, than would be the case if the paint were thinned to its final consistency. If desired the partially thinned paint may be passed through a grinding mill to secure even better disintegration of the pigment.

The following will serve as a specific example of the composition of one of the paints:—

| | Parts by weight |
|---|---|
| Fatty-acid pitch | 18.5 |
| Aqueous caseinate solution (16% casein) | 10.5 |
| Ammonia 28% | 1.5 |
| Water | 30.0 |
| Red iron-oxide | 14.5 |
| Red slate flour | 25.0 |

The fatty-acid pitch combines directly with the ammonia to form an end product which may be conveniently designated as "ammoniated fatty-acid pitch."

In making the paint, the amount of water necessary to thin to the desired consistency will depend on the amount of water carried in the caseinate solution. When thin caseinate solutions are used, less added water is necessary.

The ingredients and proportions are not confined to those stated in the specific example above given, as they may be varied without changing the essential qualities of the paint. For instance it may be at times and for certain purposes advisable to add to the pitch base a quantity of asphalt, or to add a small quantity of a softening agent such as petroleum spirits or other hydrocarbon solvent. For certain purposes the pigment content might be reduced, or entirely omitted, and this in turn would affect the amount of water necessary to thin to the desired consistency.

In using the term "fatty-acid pitch" in the appended claims, I mean pitch derived from substances containing animal or vegetable fats or oils and having saponifiable constituents.

What I claim is:—

1. A paint comprising the following ingredients, fatty-acid pitch containing saponifiable matter, neutral alkaline caseinate, ammonia, water and pigment.

2. An emulsion paint comprising ammoniated fatty-acid pitch, neutral solution of alkaline caseinate and water.

3. An emulsion paint comprising ammoniated fatty-acid pitch, neutral solution of alkaline caseinate, water and pigment.

4. An emulsion paint comprising ammoniated fatty-acid pitch, neutral solution of alkaline caseinate, water and asphalt.

5. An emulsion paint comprising ammoniated fatty-acid pitch, neutral solution of alkaline caseinate, water and a volatile solvent.

6. An emulsion paint comprising ammoniated fatty-acid pitch, neutral solution of alkaline caseinate, water, pigment and a volatile solvent.

7. An emulsion paint comprising ammoniated fatty-acid pitch, neutral solution of alkaline caseinate, water, asphalt and a volatile solvent.

8. A paint comprising the following ingredients in substantially the following proportions by weight: fatty-acid pitch 18.5 parts; aqueous caseinate solution, containing about 16% casein, 10.5 parts; ammonia 1.5 parts, water 30 parts, and pigment 39.5 parts.

HUBERT E. LLOYD.